United States Patent

[11] 3,525,355

[72] Inventor Jay R. Katchka
   Long Beach, California
[21] Appl. No. 675,099
[22] Filed Oct. 13, 1967
[45] Patented Aug. 25, 1970
[73] Assignee Robertshaw Controls Company
   Richmond, Virginia
   a corporation of Delaware

[54] FLOW CONTROL APPARATUS
   4 Claims, 2 Drawing Figs.
[52] U.S. Cl. .................................................. 137/489,
   137/495
[51] Int. Cl. ............................................. F16k 31/365
[50] Field of Search ......................................... 137/495,
   487, 489.5, 500, 505.42, 510; 251/28, 29, 36, 46;
   137/489

[56] References Cited
   UNITED STATES PATENTS
   931,228  8/1909  Schutte .................... 251/29
   1,501,331  7/1924  Gulick ..................... 251/36X
   2,772,067  11/1956  Wilson ..................... 251/45X
   3,300,174  1/1967  Urban et al. ................ 251/29
   3,386,467  6/1968  Katchka .................... 137/495

Primary Examiner— M. Cary Nelson
Assistant Examiner— Robert J. Miller
Attorneys— Auzville Jackson, Jr., Robert L. Marben and Christen, Sabol and O'Brien ABSTRACT: Flow control apparatus having an external bleed path and an internal bleed path and wherein a main stream of flow is controlled in response to the pressure of the flow in the internal bleed path which flow is controlled in response to the pressure of the flow in the external bleed path.

FIG. I

INVENTOR
JAY R. KATCHKA

BY Christen, Sabol, O'Brien & Caldwell

ATTORNEYS

INVENTOR
JAY R. KATCHKA

BY Christen, Sabol, O'Brien & Caldwell
ATTORNEYS

FLOW CONTROL APPARATUS

BACKGROUND OF THE INVENTION

The present invention relates to flow control apparatus and particularly to pressure-to-close diaphragm valve apparatus for use therein.

Flow control apparatus often requires external conduits for proper control. Such conduits are exposed to much wear and abuse and are subject to leakage and rupture. In order to construct a flow control device that protects against the hazards concomitant excessive leakage, in the past it has been necessary to use a pressure-to-open diaphragm valve to control mainstream flow. With this type of valve the mainstream flow will be stopped when there is excessive leakage in the external conduits because the pressure-to-open diaphragm valve requires pressure to keep it open, and the leakage creates a reduction of pressure which closes the valve. While pressure-to-open diaphragm valves are effective to close the flow control device when there is excessive external leakage, such valves have less desirable regulation characteristics than pressure-to-close diaphragm valves.

SUMMARY OF THE INVENTION

The present invention pertains to flow control apparatus utilizing a pressure-to-close diaphragm valve to control mainstream flow. An external bleed path and an internal bleed path are utilized to control the pressure-to-close diaphragm valve in such a manner that external leakage will be communicated to the pressure-to-close diaphragm valve as an increase in pressure which will close the valve and stop mainstream flow.

An object of the present invention is the use of an external bleed path and an internal bleed path to control a diaphragm operated valve in flow control apparatus.

Another object of the present invention is the use of a pressure actuator to control the pressure of the flow in an internal bleed path in response to the pressure of the flow in an external bleed path to thereby control a diaphragm operated valve in flow control apparatus.

The present invention has another object in that a diaphragm operated valve is controlled by an internal bleed path and an external bleed path in order to regulate mainstream flow in accordance with outlet pressure and to close the diaphragm operated valve in response to external leakage.

Another object of the present invention is the arrangement of two bleed paths to control a main path wherein the pressure of the flow in one bleed path is dependent on the pressure of the flow in the other bleed path.

Other objects and advantages of the present invention will become apparent from the following description of the preferred embodiments as shown in the accompanying drawings.

DESCRIPTION OF THE PREFERRRED EMBODIMENTS

Figure 1:
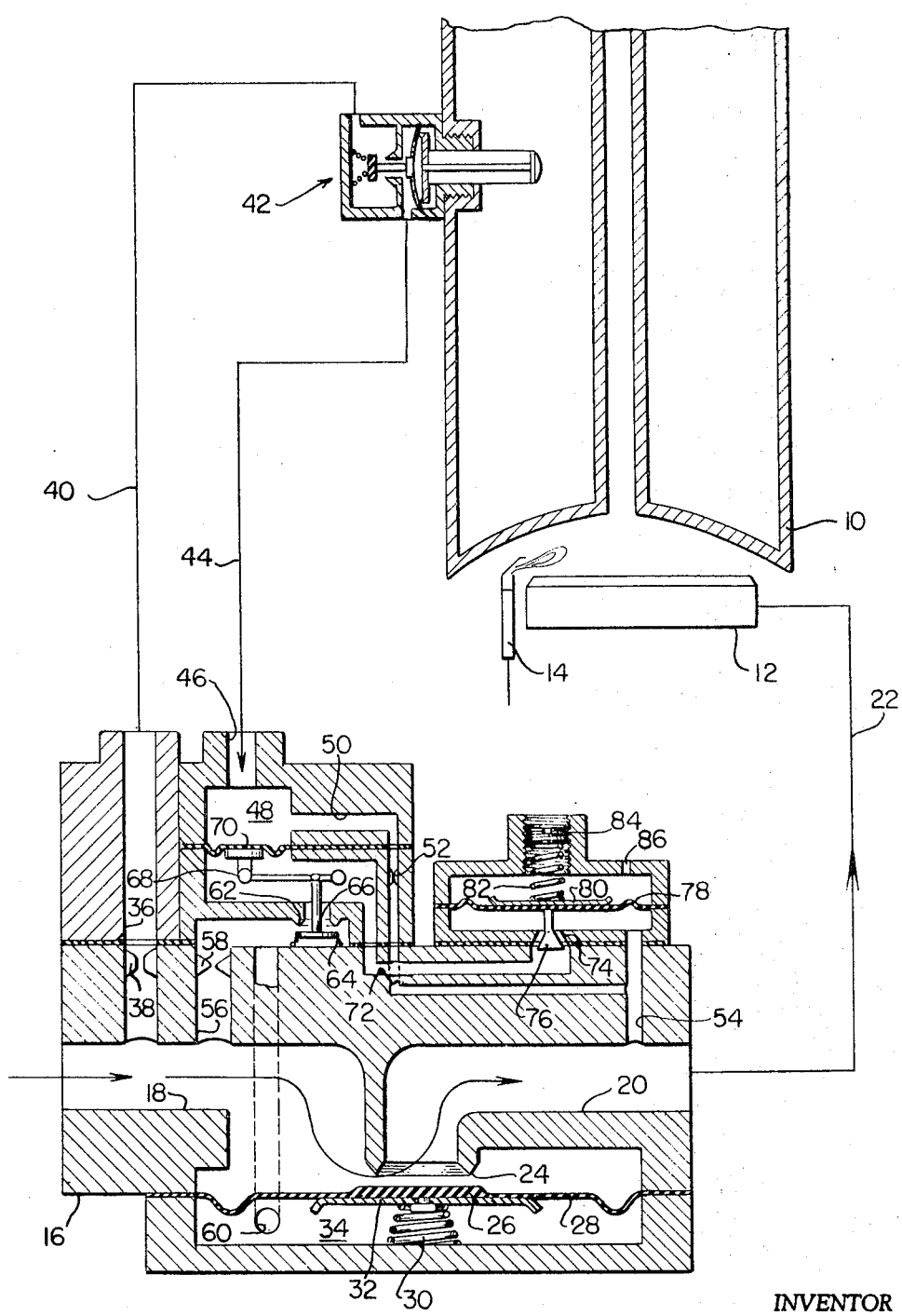
FIG. 1 is a schematic diagram having parts sectioned of an embodiment of the present invention as used in a water heater control system.

While the present invention may be utilized with various types of flow control devices, it will be described in conjunction with fuel control apparatus for a water heater control system. As is illustrated in FIG. 1, the water heater control system includes a hot water tank 10 to be heated by a main burner 12 which has a constantly burning pilot burner 14 connected to a suitable source of fuel, such as a gas supply (not shown) and located in igniting proximity to the main burner 12. Conventional safety controls and manual on-off controls may also be included in the general arrangement.

FIG. 1 illustrates an embodiment of the flow control apparatus of the present invention including a control device casing 16 having an inlet 18 adapted to be connected to the gas supply and an outlet 20 connected to the main burner 12 through a gas line 22. A main valve of the pressure-to-close type is interposed between the inlet 18 and the outlet 20 and includes a valve seat 24, a valve member 26, a flexible diaphragm 28 and a coil spring 30. The coil spring 30 is mounted in compression between the bottom wall of casing 16 and a diaphragm pan 32 which is secured to the underside of diaphragm 28. The periphery of diaphragm 28 is secured to the side walls of casing 16. The underside of diaphragm 28 and the side and bottom walls of casing 16 define an operating pressure chamber 34.

An external bleed path communicates with inlet 18 through a passage 36 having a flow restrictor 38 therein. The external bleed path includes a conduit 40, a thermostatic valve 42 and a conduit 44. The thermostatic valve 42 has not been described with particularity since it is a conventional snap-action on-off thermostatic valve, and the invention contemplates the use of any snap-action on-off valve in the external bleed path. After re-entering casing 16 at passage 46, the external bleed path leads to outlet 20 through a pressure chamber 48, a passage 50 having a flow restrictor 52 therein, and a passage 54.

An internal bleed path communicates with inlet 18 through a passage 56 having a flow restrictor 58 therein. A porting 60 communicates between the passage 56 and the operating pressure chamber 34. The passage 56 leads to a bleed path valve having a valve seat 62, a spring 64 and a valve member 66. The spring 64 is mounted between a wall of casing 16 and valve member 66, and valve member 66 is connected to a pressure actuated lever system 68 which is attached to a flexible diaphragm 70 which defines one side of pressure chamber 48. A passage 72 leads from the bleed path valve to a regulating valve which includes a valve seat 74, a valve member 76 and a flexible diaphragm 78. A diaphragm pan 80 is secured to the topside of diaphragm 78, and a coil spring 82 is mounted in compression between diaphragm pan 80 and an adjustment screw 84. The chamber which is defined by the topside of diaphragm 78 and the walls of casing 16 communicates with the atmosphere through vent passage 86.

In operation, a main stream of flow between inlet 18 and outlet 20 is controlled by the main valve. The diaphragm 28 of the main valve is subject to the pressure in operating chamber 34 on its underside and inlet pressure on its topside. The pressure differential across diaphragm 28 controls its movement and consequently controls the opening and closing of the main valve. If there is no pressure differential across diaphragm 28, coil spring 30 will close the main valve by forcing valve member 26 against valve seat 24. The pressure in chamber 34 is controlled by the pressure of the flow in the internal bleed path which pressure is controlled by the bleed path valve and the regulating valve. The bleed path valve is controlled by the pressure in chamber 48. Chamber 48 senses inlet pressure when thermostatic valve 42 is open, and when thermostatic valve 42 and the main valve are closed, chamber 48 senses atmospheric pressure through passages 50 and 54. When thermostatic valve 42 is changed from an open position to a closed position, the flow in the external bleed path will be stopped, and the pressure in chamber 48 will be reduced from inlet pressure thereby allowing coil spring 64 to force valve member 66 up to engage valve seat 62 and close the bleed path valve. When thermostatic valve 42 is changed from a closed position to an open position, there will be flow through the external bleed path, and the pressure in chamber 48 will increase to inlet pressure, which will be maintained to a high degree by flow restrictor 52. The pressure in chamber 48 is transmitted to valve member 66 through pressure actuated lever system 68 to open the bleed path valve. The regulating valve is conventional and its operation will be explained only in general terms. The passage 54 acts as an outlet pressure sensing port to communicate the pressure at outlet 20 to diaphragm 78 which accordingly, deflects upward with an increase in outlet pressure and downward with a decrease in outlet pressure. An upward deflection of diaphragm 78 will tend to close the regulating valve whereas a downward deflection of diaphragm 78 will tend to open the regulating valve. The extent of the opening of the regulating valve with respect to outlet pressure may be controlled by adjustment of screw 84 as is well known in the art.

Porting 60 communicates the pressure of the flow in the internal bleed path to operating chamber 34. Any variation in the pressure of the internal bleed path flow will be reflected by a movement of diaphragm 28. Consequently, when the bleed path valve is closed the main valve will be closed because operating chamber 34 will be at inlet pressure, and there will be no pressure differential across diaphragm 28. Accordingly, when the bleed path valve is opened the pressure in operating chamber 34 will decrease and the main valve will open. When the bleed path valve is open, the regulating valve acts to further control the pressure of the flow in the internal bleed path. When the regulating valve opens wider due to a decrease in outlet pressure, the main valve will open wider due to a decrease in the pressure in operating chamber 34, which will compensate for the decrease in outlet pressure which originally caused the regulating valve to open wider. Similarly, if there is an increase in outlet pressure the regulating valve will tend to close which will cause the main valve to tend to close, due to an increase in the pressure in operating chamber 34, which will decrease the outlet pressure. Basically, the main valve responds to on-off control through the bleed path valve and regulation through the regulating valve.

The operation of the water heater control system of FIG. 1 is such that if heat is required from main burner 12, thermostatic valve 42 will open which causes the bleed path valve to open which will in turn open the main valve. This will permit a main stream of gas flow to main burner 12 subject to regulation via the regulating valve. If there is any leakage in the external bleed path, it will be sensed as a reduction of pressure in chamber 48 which will cause the closure of the bleed path valve and consequently, the closure of the main valve to protect against the hazards caused by such leakage.

When heat is no longer required from main burner 12, thermostatic valve 42 will close. The stoppage of flow in the external bleed path will cause the pressure in chamber 48 to decrease from inlet pressure and thereby close the bleed path valve and the main valve.

Figure 2:
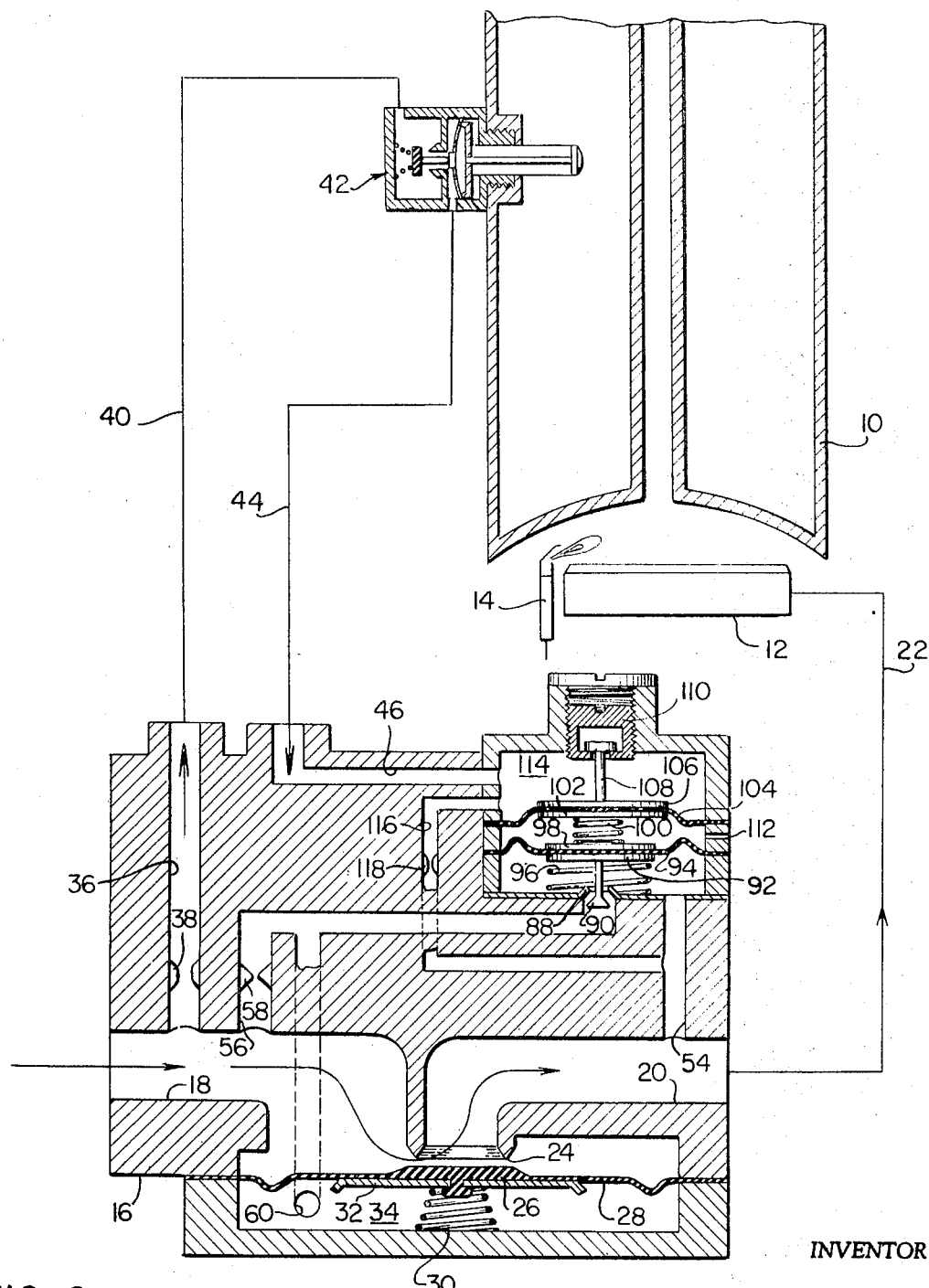
FIG. 2 is a schematic diagram having parts sectioned of another embodiment of the present invention as used in a water heater control system.

The embodiment of the present invention shown in FIG. 2 differs from the embodiment of FIG. 1 in that one dual-diaphragm valve is utilized to perform the function of both the bleed path valve and the regulating valve of FIG. 1. The structure common to FIGS. 1 and 2 will not be described again and will be given identical reference numerals for the sake of brevity.

In FIG. 2 an internal bleed path communicates with inlet 18 through passage 56. The internal bleed path further includes a dual-function valve and a passage 54 leading to outlet 20. The dual-function valve includes a valve seat 88 and a valve member 90 which is secured to a diaphragm pan 92. Diaphragm pan 92 is secured to the underside of a flexible diaphragm 94, and a closure spring 96 is mounted between a wall of casing 16 and diaphragm pan 92. A diaphragm pan 98 is secured to the topside of diaphragm 94 and a regulating spring 100 is mounted between diaphragm pan 98 and a diaphragm pan 102 which is secured to the underside of a flexible diaphragm 104. A diaphragm pan 106 is secured to the topside of diaphragm 104 and is connected to a rod 108 which extends into a cavity in an adjustment screw 110. A passage 112 vents the chamber between diaphragms 94 and 104 to the atmosphere.

An external bleed path communicates with inlet 18 through a passage 36 and leads to outlet 20 through conduit 40, thermostatic valve 42, conduit 44, passage 46, a pressure chamber 114, passage 116 having a flow restrictor 118 therein, and passage 54.

The operation of the main valve is dependent on the pressure of the flow in the internal bleed path in the same manner as described in FIG. 1. The first function of the dual-function valve is as an on-off control of the internal bleed path in response to the pressure of the flow in the external bleed path. Chamber 114 senses atmospheric pressure through passages 54 and 116 when thermostatic valve 42 and the main valve are closed. Since at this time there is no pressure differential across diaphragms 94 and 104, closure spring 96 will force diaphragms 94 and 104 up to cause valve member 90 to engage valve seat 88 and close the dual-function valve. When thermostatic valve 42 is opened, chamber 114 senses inlet pressure through passage 36, conduits 40 and 44 and passage 46, and the inlet pressure is maintained in chamber 114 to a high degree by flow restrictor 118. The inlet-to-atmospheric pressure differential across diaphragm 104 causes it to deflect downward to overcome closure spring 96 and open the dual-function valve. The seating of the top portion of rod 108 on the bottom wall of the cavity of adjustment screw 110 limits the downward deflection, and, consequently, a maximum regulation setting may be obtained by turning adjustment screw 110. Passage 54 communicates outlet pressure to the underside of diaphragm 94 which senses atmospheric pressure on its topside along with the force from regulator spring 100. After the dual-function valve is opened it serves to regulate outlet pressure due to the movement of diaphragm 94 with changes in outlet pressure. The dual-function valve completely controls the flow in the internal bleed path and thereby controls the main valve as explained in the description of FIG. 1.

In operation of the water heater control system, when heat is required from main burner 12, thermostatic valve 42 will be opened which will cause the dual-function valve and the main valve to open thereby supplying gas to main burner 12. If there is any leakage in the external bleed path at this time it will cause the pressure in chamber 114 to decrease and thereby permit closure spring 96 to close the dual-function valve which closes the main valve to shut down the system.

After heat from main burner 12 is no longer required, thermostatic valve 42 will close which will cause the closure of the dual-function valve and the main valve thereby stopping the flow of gas to main burner 12.

Inasmuch as the present invention is subject to many other modifications, variations and changes in details, it is intended that all matter contained in the foregoing description or shown in the accompanying drawings shall be interpreted as illustrative and not in a limiting sense.

I claim:
1. Flow control apparatus comprising:
a casing having an inlet and an outlet;
a diaphragm operated main valve for controlling a flow between said inlet and said outlet;
first bleed path means between said inlet and said outlet;
second bleed path means between said inlet and said outlet having a portion for effecting operation of said diaphragm operated main valve;
control means responsive to flow in said first bleed path means to control flow in said second bleed path means and effect operation of said diaphragm operated main valve;
said control means including first valve means in said second bleed path means and pressure responsive means arranged to control said valve means in response to flow in said first bleed path means; and
said first bleed path means including a pressure chamber whereby said pressure responsive means is responsive to a drop in pressure in said pressure chamber to close said valve means;
said control means also including second valve means in said second bleed path means, and means for controlling said second valve means in response to flow at said outlet.
2. Flow control apparatus comprising:
a casing having an inlet and an outlet;
diaphragm operated main valve for controlling a flow between said inlet and said outlet;

first bleed path means between said inlet and said outlet;

second bleed path means between said inlet and said outlet having a portion for effecting operation of said diaphragm operated main valve;

control means responsive to flow in said first bleed path means to control flow in said second bleed path means and effect operation of said diaphragm operated main valve;

said control means including pressure operated valve means located in said second bleed path means;

said first bleed path means including a pressure chamber; and said pressure operated valve means including a first diaphragm subject to pressure in said pressure chamber and a second diaphragm subject to pressure at said outlet.

3. The apparatus as recited in claim 2 wherein said pressure operated valve means includes first spring means mounted between said first diaphragm and said second diaphragm, and second spring means mounted between said second diaphragm and said casing whereby said first diaphragm and said second spring means cooperate to control said diaphragm operated main valve in an on-off manner and said second diaphragm and said first spring means cooperate to regulate the pressure at said outlet.

4. The apparatus as recited in claim 2 wherein said first bleed path means includes a portion external to said casing and valving means in said external portion.